Feb. 2, 1932. W. BAUERSFELD ET AL 1,843,439
INSTRUMENT FOR OBSERVING STEREOSCOPICAL IMAGES
Filed Aug. 25, 1930
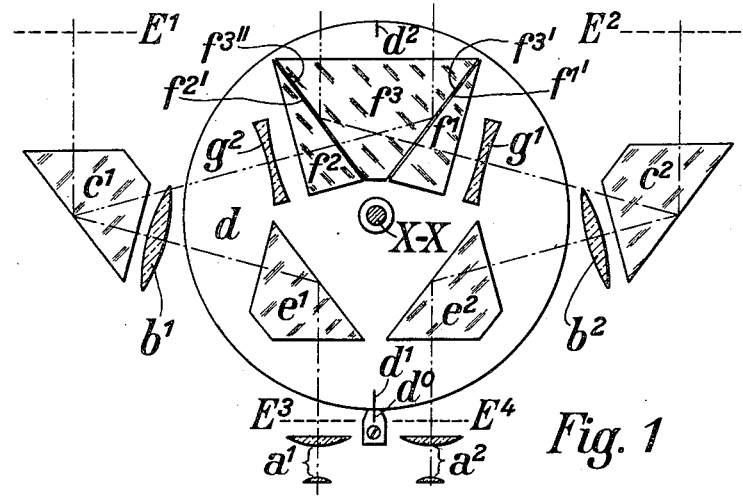
Fig. 1
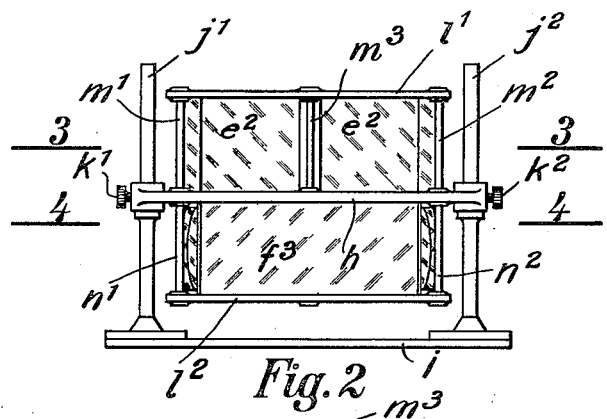
Fig. 2
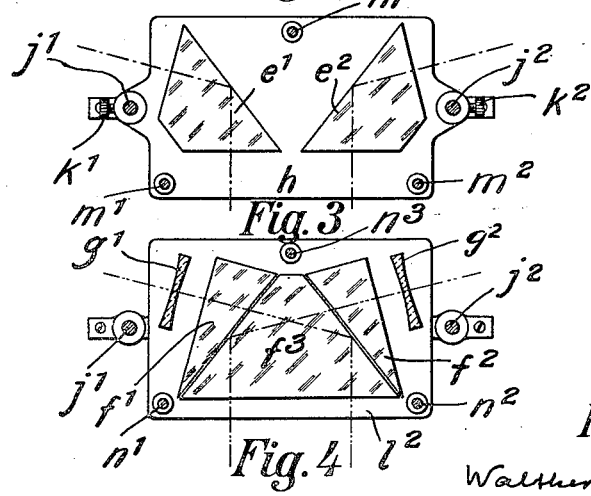
Fig. 3
Fig. 4
Inventors:
Walther Bauersfeld
Hans Krippenbender Patented Feb. 2, 1932

1,843,439

UNITED STATES PATENT OFFICE

WALTHER BAUERSFELD, OF JENA, AND HEINZ KÜPPENBENDER, OF DRESDEN, GERMANY, ASSIGNORS TO FIRM CARL ZEISS, OF JENA, GERMANY

INSTRUMENT FOR OBSERVING STEREOSCOPICAL IMAGES

Application filed August 25, 1930, Serial No. 477,728, and in Germany July 26, 1929.

The invention relates to an instrument for observing stereoscopical images which is to be used preferably with stereophotogrammetric measuring apparatus and in which mirrors are commutatably arranged so as to offer the viewer at will either a stereoscopically correct or a stereoscopically reversed spatial image of the object presented to his view by stereoscopic photographs. Such observing instruments have been used for increasing the exactness of the measurements or for facilitating the setting together of consecutive pictures in the evaluation of serial images. For this purpose either all the halves of the observing instrument were rotatably arranged or several mirrors of the one half of the instrument were made interchangeable with several mirrors of the other half.

In observing instruments of this kind all mirrors continually participate in presenting a spatial image either stereoscopically correct or stereoscopically reversed. The present invention aims at providing a new solution in which certain mirrors are effective in the production only of one of the two spatial images and do not affect that of the other. According to the new solution all commutatable mirrors belong to two differently constructed prism systems disposed on one movable carrier which, when turned or otherwise displaced, inserts either the one or the other of these systems in the path of the rays so as to subject the photographs to an observation with intersecting or not intersecting ray paths, quite in accordance with which of the said two lens systems is inserted in each instance.

One of these two prism systems conveniently consists of three members whereof each of the two surfaces with which the three members bound each other permits of passing one of the two ray pencils to be directed to one of the two eyepieces and of reflecting the other. For this purpose the said surfaces either are transparently silvered or they may have between them thin layers of air. Especially simple conditions in optical respect are obtained when the second prism system that is alternately inserted in the path of the rays consists of two single reflecting prisms whose reflecting surfaces are each parallel to one of the two surfaces with which the three members of the other prism system bound each other.

In the accompanying drawings which schematically represent an example of the invention, Figure 1 illustrates the case in which the two prism systems are inserted in the path of the rays by turning their carrier, while Figures 2 to 4 illustrate that case in which the said insertion of the prism systems is effected by displacing their carrier, whereby Figure 2 shows the prism systems and their carrier in a vertical section and Figures 3 and 4 represent partial sections on the lines 3—3 and, respectively, 4—4 indicated in Figure 2.

In Figure 1, $E^1$ and $E^2$ represent two image planes in each of which are supposed to lie a real half image of an object and of a mark, which two half images are assumed to be produced by a lens system that, for the sake of simplicity, is left away. For imaging the two half images in the image planes $E^3$ and, respectively, $E^4$ of two eyepieces $a^1$ and $a^2$ are provided two objectives, $b^1$ and $b^2$, two single reflecting prisms, $c^1$ and $c^2$, and, in each instance, one of two prism systems fixed to a disc $d$ rotatable about an axis X—X. One of these two prism systems consists of two single reflecting prisms, $e^1$ and $e^2$. When the disc $d$ is turned about the axis X—X and the just mentioned prism system is then inserted in the path of the rays, which is indicated by an indicator $d^1$ of the disc $d$ being in line with a fixedly provided counter-indicator $d^0$ (which case is shown in the drawings), each of the two eyepieces offers the view of that half image which lies in that half of the instrument which belongs to the respective eyepiece, viz. the eyepiece $a^1$ the view of the half image lying in the image plane $E^1$ and the eyepiece $a^2$ the view of the half image lying in the image plane $E^2$, which means that the viewer has the sensation of a stereoscopically correct spatial image. The other of the two prism systems consists of three members, $f^1$, $f^2$, and $f^3$, of which the middle one, $f^3$, has two surfaces, $f^{3\prime}$ and $f^{3\prime\prime}$, that are parallel to the reflecting surfaces of the prisms $e^2$ and $e^1$, respectively. The two members $f^1$ and $f^2$ are placed relatively to the middle member, $f^3$, in such a way that the surface $f^1$ of the member $f^1$ and the surface $f^{2\prime}$ of the member $f^2$ are separated from the surfaces $f^{3\prime}$ and, respectively, $f^{3\prime\prime}$ only by thin layers of air. When the prism system $f^1, f^2, f^3$ is inserted in the path of the rays, which is the case as soon as an indicator $d^2$ enclosing with the indicator $d^1$ an angle of 180° and being provided on the disc $d$ is in line with the counter-indicator $d^0$, each of the two eyepieces offers the view of that half image which lies in that half of the instrument which belongs to the other eyepiece, viz. the eyepiece $a^1$ the view of the half image lying in the image plane $E^2$ and the eyepiece $a^2$ the view of the half image lying in the image plane $E^1$. The consequence is that the paths of the rays intersect and offer the viewer a stereoscopically reversed spatial image. In this case the thin layer of air between the two surfaces $f^{1\prime}$ and $f^{3\prime}$ does not influence the rays emanating from the image plane $E^1$ but causes the rays coming from the image plane $E^2$ to reflect on the surface $f^{3\prime}$. On the other hand, the thin layer of air between the two surfaces $f^{2\prime}$ and $f^{3\prime\prime}$, while being ineffective as regards the rays coming from the image plane $E^2$, causes the rays coming from the image plane $E^1$ to reflect on the surface $f^{3\prime\prime}$. In order to ensure sharp images despite the altered length of the ray path between the image planes $E^1$ and $E^2$ and the eyepiece image planes $E^4$ and, respectively, $E^3$, which is caused by inserting the prism system $f^1, f^2, f^3$, the two members $f^1$ and $f^2$ of the prism system have in front negative lenses $g^1$ and $g^2$, respectively.

In the second constructional example, illustrated by Figures 2 to 4, the used optical members are the same as those in the constructional example according to Figure 1. For the sake of simplicity the drawing represents only those optical members which are disposed on the rotatable disc $d$ in the constructional example according to Figure 1. In the constructional example according to Figures 2 to 4 these optical members are fixedly provided on a disc $h$ which is displaceable along two columns $j^1$ and $j^2$ fixed to a base plate $i$ and can be adjusted relatively to these columns by means of clamping screws $k^1$ and $k^2$. Of the two optical members the two single reflecting prisms $e^1$ and $e^2$ lie above and the prism system $f^1, f^2, f^3$ as well as the lenses $g^1$ and $g^2$ lie below the plate $h$. All members are fixed relatively to the disc $h$ by means of holding discs $l^1$ and $l^2$ attached to the disc $h$ by means of bolts $m^1, m^2, m^3$ and $n^1, n^2, n^3$, respectively.

When the observer is to be presented a stereoscopically correct spatial image, the disc $h$ must be so adjusted that the prisms $e^1$ and $e^2$ lie in the ray path of the observing instrument. In this case the prism system $f^1, f^2, f^3$ and the lenses $g^1$ and $g^2$ are outside the ray path and, therefore, ineffective. Contrary thereto, when the observer is to be presented a stereoscopically reversed spatial image, the disc $h$ must be so adjusted that the prism system $f^1, f^2, f^3$ and the lenses $g^1$ and $g^2$ lie within the ray path. In this case it is the prisms $e^1$ and $e^2$ which are ineffective.

We claim:

1. An instrument for observing stereoscopical images, comprising two oculars, a movably mounted carrier and two prism systems for alternative use, the prism systems being fixed to a common carrier, each prism system having two reflecting surfaces inclined towards each other, the reflecting surfaces of the one system being divergent from the oculars when this system is in position for use, and the reflecting surfaces of the other system being convergent towards the oculars when this other system is in position for use.

2. In an instrument according to claim 1 the carrier being displaceably mounted.

3. In an instrument according to claim 1 the carrier being rotatably mounted.

4. An instrument for observing stereoscopical images, comprising two oculars, a movable mounted carrier and two prism systems for alternative use, the prism systems being fixed to a common carrier, each prism system having two reflecting surfaces inclined towards each other, the reflecting surfaces of the one system being divergent from the oculars when this system is in position for use, and the reflecting surfaces of the other system being convergent towards the oculars when this other system is in position for use, the said other prism system consisting of three members and each of the two surfaces with which the three members bound each other being adapted to pass a system of ray pencils entering the prism system from one side and to reflect a system of ray pencils entering the prism from the other side.

5. An instrument for observing stereoscopical images, comprising two oculars, a movably mounted carrier and two prism systems for alternative use, the prism systems being fixed to a common carrier, each prism system having two reflecting surfaces inclined towards each other, the reflecting surfaces of the one system being divergent from the oculars when this system is in position for use, and the reflecting surfaces of the other system being convergent towards the oculars when this other system is in position for use, one of the two prism systems consisting of a medial member and two side members, the two side members bounding the medial one with surfaces that are parallel to the corresponding surfaces of the medial member and are at a small distance from same.

6. An instrument for observing stereoscopical images, comprising two oculars, a movably mounted carrier and two prism systems for alternative use, the prism systems being fixed to a common carrier, each prism system having two reflecting surfaces inclined towards each other, the reflecting surfaces of the one system being divergent from the oculars when this system is in position for use, and the reflecting surfaces of the other system being convergent towards the oculars when this other system is in position for use, one of the two prism systems consisting of three members and each of the two surfaces with which the three members bound each other being adapted to pass a system of ray pencils entering the prism system from one side and to reflect a system of ray pencils entering the prism from the other side, and the other prism system consisting of two single reflecting prisms whose reflecting surfaces are each parallel to one of the two surfaces with which the three members of the first said prism system bound each other.

WALTHER BAUERSFELD.
HEINZ KÜPPENBENDER.